US006308821B1

(12) United States Patent
Asai et al.

(10) Patent No.: US 6,308,821 B1
(45) Date of Patent: Oct. 30, 2001

(54) LINEAR WORKING APPARATUS

(75) Inventors: Go Asai; Kazuhiro Iida, both of Toride (JP)

(73) Assignee: SMC Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/549,618

(22) Filed: Apr. 14, 2000

(30) Foreign Application Priority Data

Apr. 16, 1999 (JP) ........................................ 11-110158

(51) Int. Cl.[7] ........................................ B65G 25/00
(52) U.S. Cl. ........................................ 198/750.7
(58) Field of Search ........................ 198/468.9, 750.1, 198/750.7; 414/749.1

(56) References Cited

U.S. PATENT DOCUMENTS 5,211,279 * 5/1993 Abbestam et al. ................ 198/750.1
5,469,775 11/1995 Stoll et al. ................................ 92/88
5,484,051 * 1/1996 Nagai et al. ...................... 198/750.7

FOREIGN PATENT DOCUMENTS 41 37 789 5/1993 (DE) .
0 346 504 12/1989 (EP) .
09-177717 7/1997 (JP) .

* cited by examiner

*Primary Examiner*—Joseph E. Valenza
(74) *Attorney, Agent, or Firm*—Paul A. Guss

(57) ABSTRACT

A rail member and a rodless cylinder are arranged closely substantially in parallel to one another, and shock absorbers and the rail member are arranged closely substantially in parallel to one another. Accordingly, it is possible to arrange, in an ideal layout, the three components of the rail member, the rodless cylinder, and the shock absorbers. Further, it is possible to realize a compact size of the entire apparatus.

10 Claims, 9 Drawing Sheets

10

1

LINEAR WORKING APPARATUS

BACKGROUND OF THE INVENTION

1. Field of the Invention

The present invention relates to a linear working apparatus which functions, for example, as a workpiece transport means by operating a slider in a reciprocating manner.

2. Description of the Related Art

In recent years, a variety of linear working machines including, for example, rodless cylinders are adopted as workpiece transport means in the factory or the like. Such a linear working machine concerning the conventional technique is shown in FIG. 9 (see Japanese Laid-Open Patent Publication No. 9-177717).

The linear working machine 1 includes a base plate 2 which has a flat plate-shaped configuration, a pair of end blocks 3*a*, 3*b* which are connected to both ends in the axial direction of the base plate 2, and a rodless cylinder 4 which is fixed between the end blocks 3*a*, 3*b*.

A guide rail 5, which is disposed substantially in parallel to the axis of the rodless cylinder 4, is fixed to the base plate 2. A pair of shock absorbers 6*a*, 6*b* are arranged opposingly substantially in parallel to the axis of the rodless cylinder 4 between the guide rail 5 and the rodless cylinder 4. A slide table 7, which makes linear reciprocating movement along the guide rail 5 in accordance with the driving action of the rodless cylinder 4, is provided on the base plate 2.

However, in the case of the linear working machine 1 concerning the conventional technique described above, the pair of shock absorbers 6*a*, 6*b* are interposed between the rodless cylinder 4 and the guide rail 5 which are arranged substantially in parallel to one another. Therefore, a problem arises in that the distance of separation is inevitably increased between the rodless cylinder 4 and the guide rail 5.

That is, when the kinetic energy (thrust force) is transmitted from the rodless cylinder 4 to the slide table 7 in order to start the movement of the slide table 7, the reaction force is generated on the guide rail 5 on which the slide table 7 is displaced. The larger the separation distance between the rodless cylinder 4 and the guide rail 5 is, the more the reaction force is increased. In other words, the smaller the separation distance between the rodless cylinder 4 and the guide rail 5 is, the more the reaction force is repressed. Therefore, ideally, it is desirable that the rodless cylinder 4 and the guide rail 5 are arranged as closely to one another as possible.

When the shock absorber 6*a*, 6*b* absorbs the impact force at the terminal end of the displacement of the slide table 7, the reaction force of the shock absorber 6*a*, 6*b* is applied to the guide rail 5. The larger the separation distance between the shock absorbers 6*a*, 6*b* and the guide rail 5 is, the more the reaction force is increased. Therefore, in order to suppress the reaction force applied to the guide rail 5, ideally, it is desirable that the shock absorbers 6*a*, 6*b* and the guide rail 5 are arranged as closely to one another as possible.

SUMMARY OF THE INVENTION

A general object of the present invention is to provide a linear working apparatus comprising three components of a driving mechanism, a track mechanism, and a buffering mechanism which are arranged in an ideal layout, making it possible to realize a compact size of the entire apparatus.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
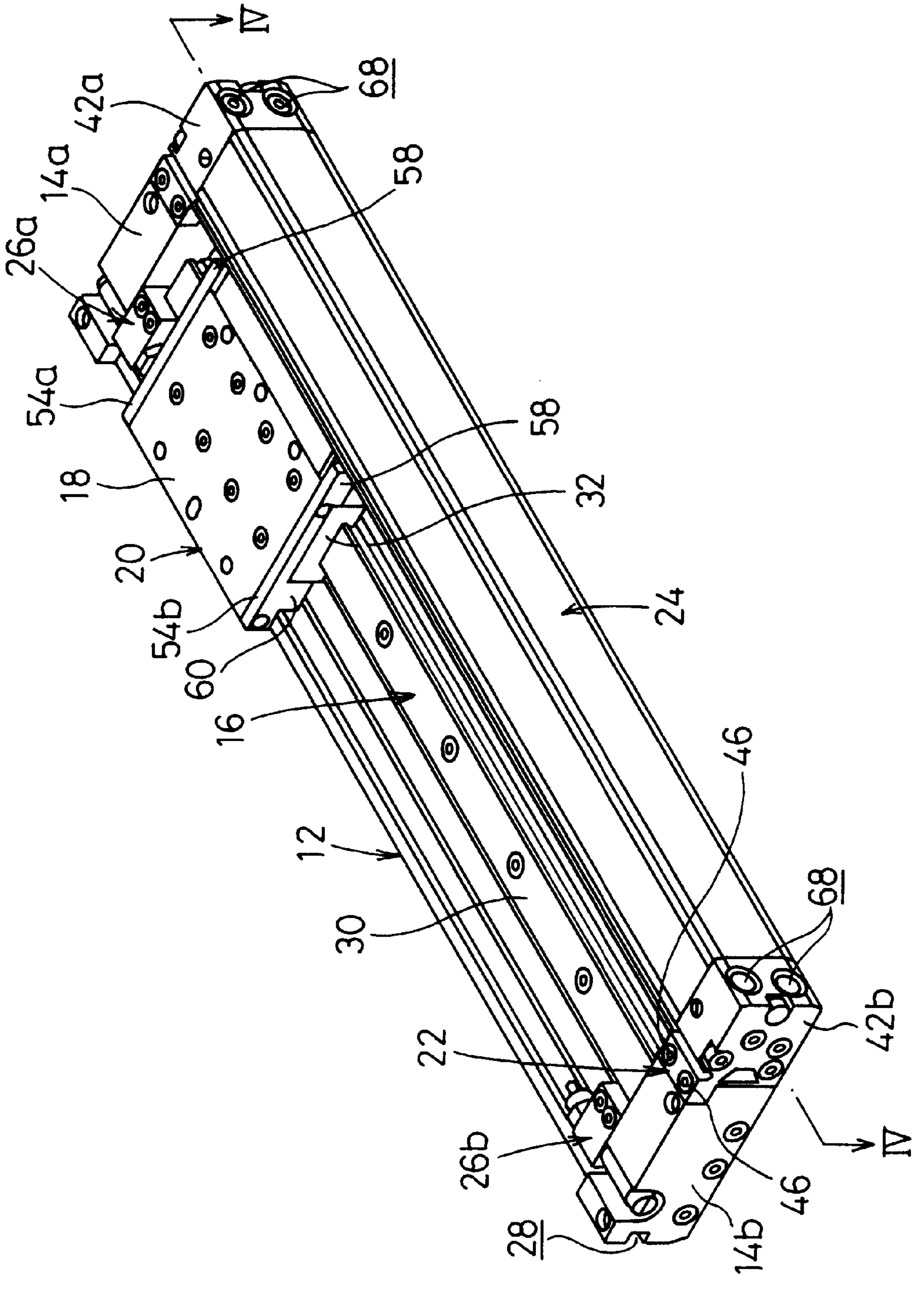
FIG. 1 shows a perspective view illustrating a linear working apparatus according to an embodiment of the present invention.

In FIG. 1, reference numeral 10 indicates a linear working apparatus according to an embodiment of the present invention.

The linear working apparatus 10 comprises a base plate (base member) 12 which has a flat plate-shaped configuration, a pair of end blocks 14*a*, 14*b* which are connected to both ends in the axial direction of the base plate 12 respectively, a linear guide mechanism (track mechanism) 16 which is secured in the axial direction to a substantially central portion of the base plate 12, and a slider 20 which is formed with a substantially flat workpiece attachment surface 18 on its upper surface and which makes reciprocating movement in the axial direction of the base plate 12 along the linear guide mechanism 16. The workpiece attachment surface 18 of the slider 20 may be used in any way including, for example, a case in which an unillustrated workpiece is directly attached thereto or placed thereon, and a case in which the workpiece is indirectly attached thereto or placed thereon by the aid of any member.

The linear working apparatus 10 further comprises a rodless cylinder (driving mechanism) 24 which is connected to a side portion of the base plate 12 by the aid of attachment mechanisms 22 and which is arranged substantially in parallel to the linear guide mechanism 16, and a pair of shock absorbers (buffering mechanisms) 26*a*, 26*b* which are arranged opposingly on a side opposite to the rodless cylinder 24 with the linear guide mechanism 16 interposed therebetween. A sensor attachment long groove 28 having a rectangular cross section is formed in the axial direction on a side of the base plate 12 opposite to the side on which the rodless cylinder 24 is connected. The shock absorbers 26*a*, 26*b* function such that the terminal end of the displacement of the slider 20 is regulated, and the shock applied to the slider 20 is absorbed.

The linear guide mechanism 16 has a lengthy rail member 30 which is secured to an upper surface portion of the base plate 12 by the aid of screw members, and a pair of guide blocks (sliding members) 32 which are slidably displaceable along the rail member 30 in accordance with the rolling action of a plurality of unillustrated ball bearings. The slider 20 is secured to the upper surfaces of the pair of guide blocks 32 by the aid of screw members. The slider 20 is provided displaceably along the rail member 30 by the aid of the guide blocks 32. A plurality of unillustrated roller members (rolling members) having a cylindrical configuration are provided rollably on a bottom surface portion of the slider 20 in place of the guide blocks 32 so that the slider 20 may be displaced along the rail member 30 in accordance with the rolling action of the roller members.

Figure 6:
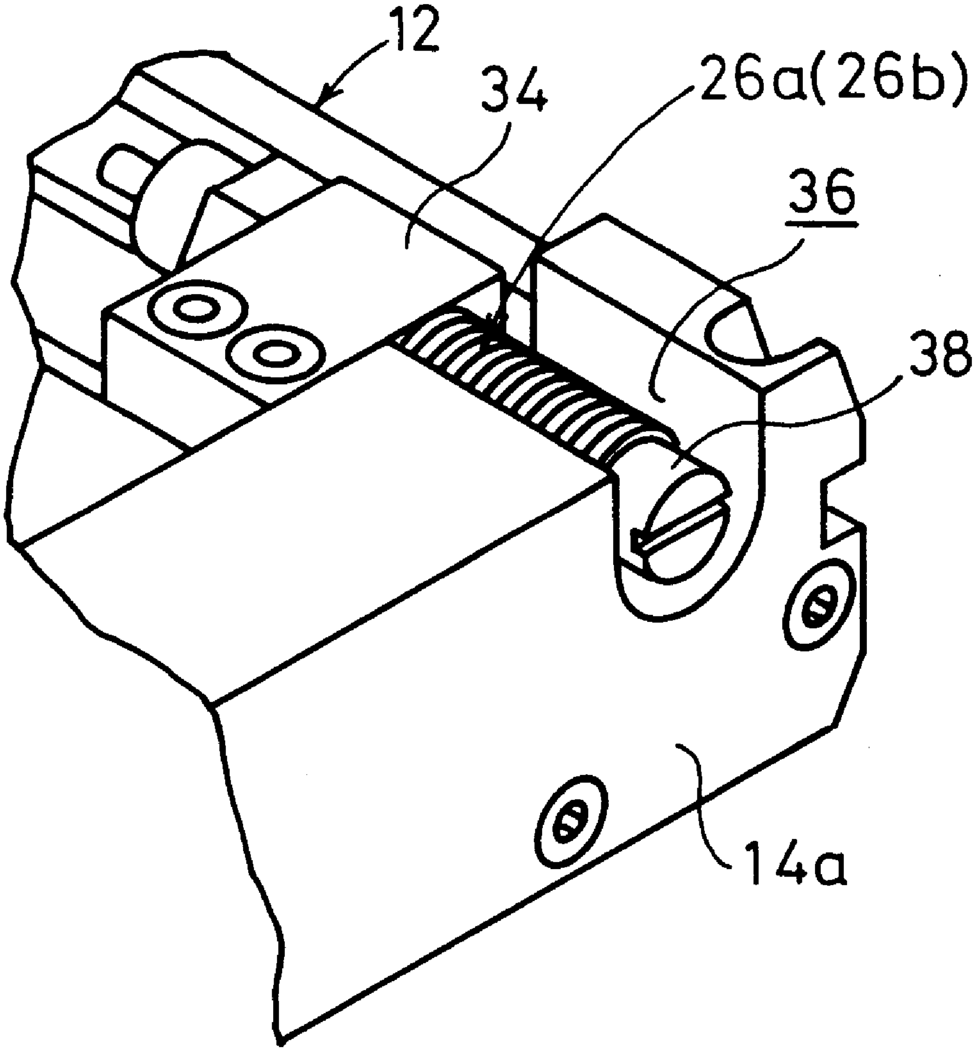
FIG. 6 shows, with partial omission, a magnified perspective view illustrating a shock absorber.

As shown in FIG. 6, the shock absorber 26*a*, 26*b* is fixed to the base plate 12 by the aid of a block member 34. A screw member 38 for controlling the buffering force is provided through the end block 14*a*, 14*b* with a cutout 36 having a semielliptic cross section. In this arrangement, the pair of shock absorbers 26*a*, 26*b* are arranged opposingly by being separated from each other by a predetermined spacing distance, and they are arranged such that a phantom line obtained by connecting the pair of shock absorbers 26*a*, 26*b* is substantially parallel to the axis of the rail member 30. The pair of shock absorbers 26*a*, 26*b* are arranged as closely as possible with respect to the rail member 30.

Figure 2:
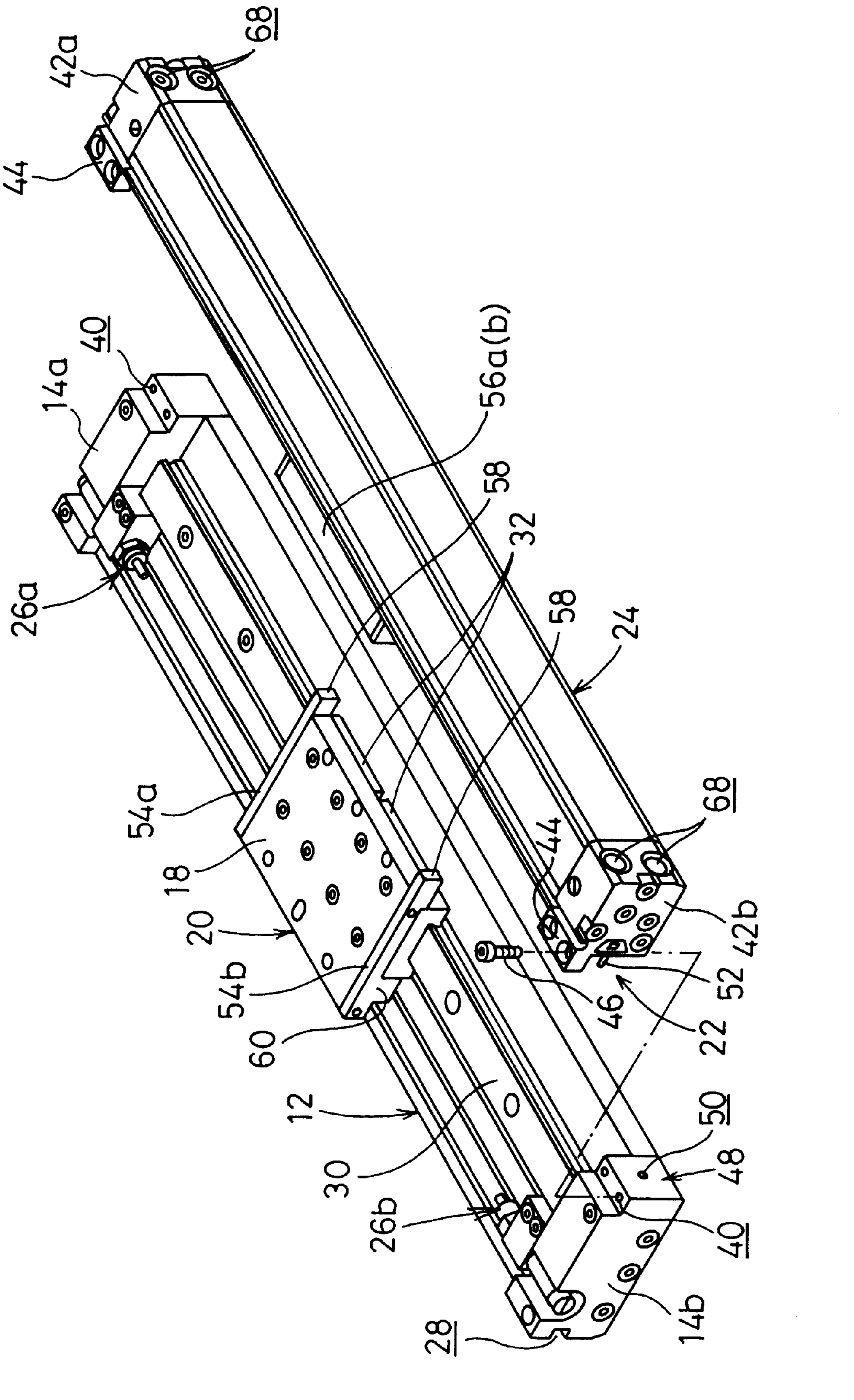
FIG. 2 shows an exploded perspective view illustrating a base plate and a rodless cylinder for constructing the linear working apparatus.
Figure 3:
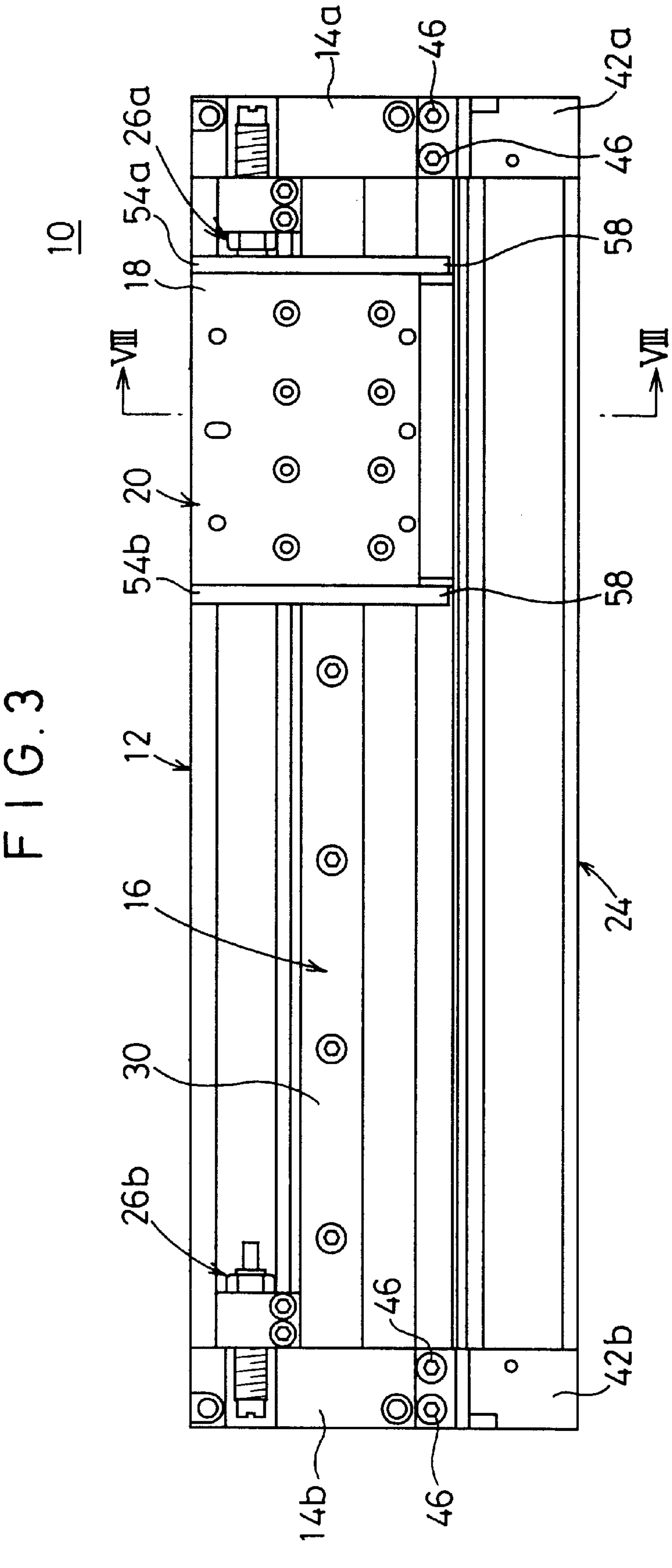
FIG. 3 shows a plan view illustrating the linear working apparatus shown in FIG. 1.

As shown in FIG. 2, the attachment mechanism 22 for detachably connecting the base plate 12 and the rodless cylinder 24 is provided at the connecting portion between the end block 14*a*, 14*b* and the rodless cylinder 24. The attachment mechanism 22 includes a recess 40 which is formed on the end block 14*a*, 14*b*, a projection 44 which is provided on an end cap 42*a*, 42*b* of the rodless cylinder 24 and which is connected to the recess 40, and screw members 46 for fastening the projection 44 to the recess 40 by means of screws. In this arrangement, the screw members 46 are provided so that they may be screwed in a direction substantially perpendicular to the workpiece attachment surface 18 of the slider 20 (from an upward position).

A positioning mechanism 48 is provided at the connecting portion between the end block 14*a* (14*b*) and the rodless cylinder 24. The positioning mechanism 48 includes a small hole 50 which is formed on one side surface of the end block 14*a* (14*b*), and a projection 52 which protrudes outwardly from the end cap 42*a* (42*b*) of the rodless cylinder 24. In this arrangement, the base plate 12 and the rodless cylinder 24 are connected in a positioned state by inserting the projection 52 into the small hole 50.

A pair of end plates 54*a*, 54*b*, which extend in a direction substantially perpendicular to the axis, are connected to both ends of the slider 20. The end plate 54*a*, 54*b* has an engaging section 58 which protrudes laterally from the end surface of the slider 20 for making engagement with a piston yoke 56*a*, 56*b* (see FIG. 5) as described later on, and a substantially flat abutment surface 60 for making abutment against the shock absorber 26*a*, 26*b*.

Figure 8:
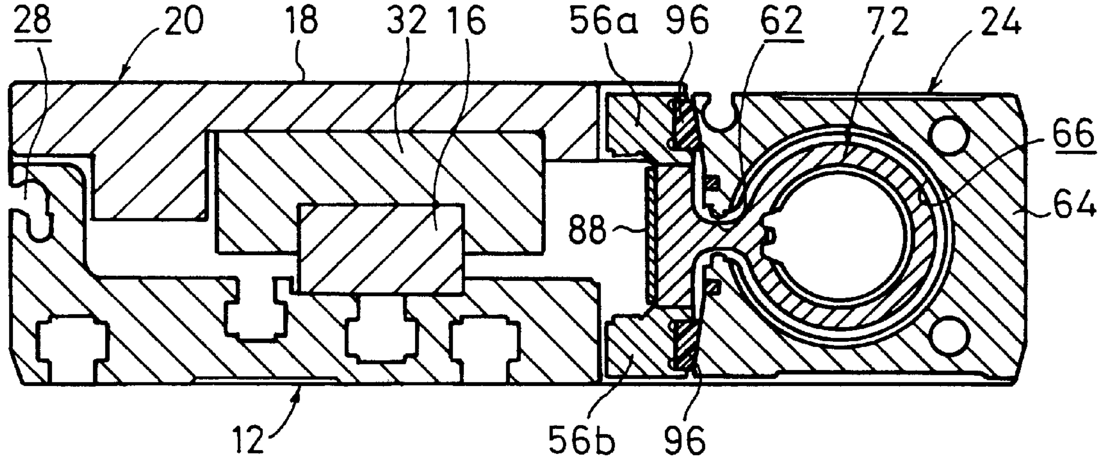
FIG. 8 shows, with partial omission, a longitudinal sectional view taken along a line VIII—VIII shown in FIG. 3.
Figure 9:
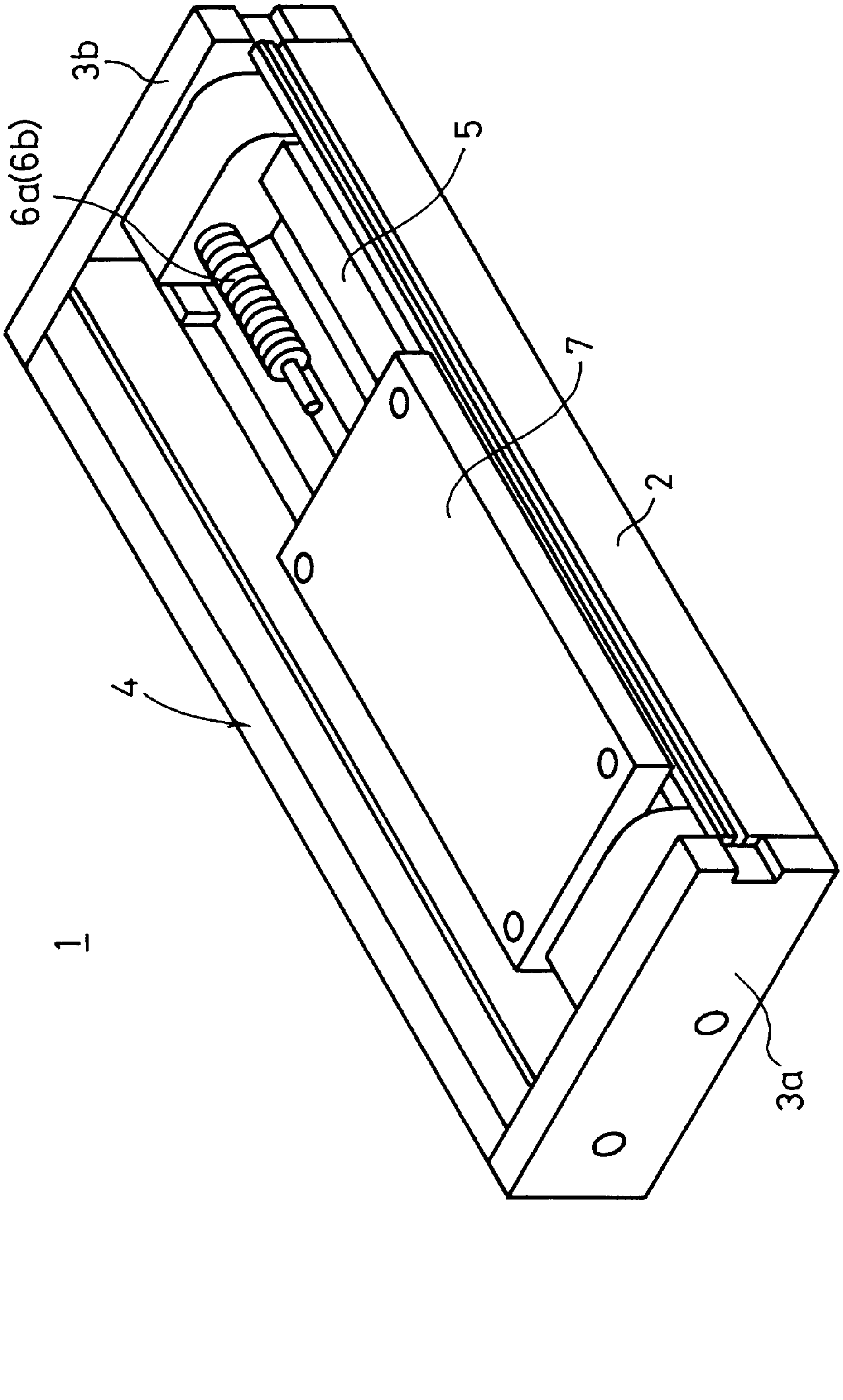
FIG. 9 shows a perspective view illustrating a linear working machine concerning the conventional technique.

As shown in FIG. 8, the rodless cylinder 24 has a cylinder tube 64 with a slit 62 which is formed at an end surface portion, the slit 62 extending in the axial direction. A bore 66, which extends in the longitudinal direction, is provided at the inside of the cylinder tube 64. The bore 66 is in a state of communication with the outside via the slit 62 which is formed at the end surface portion of the cylinder tube 64.

Both ends of the cylinder tube 64 are closed in an air-tight manner by the rectangular parallelepiped-shaped end caps 42*a*, 42*b* (see FIG. 1) which are formed with a pair of pressure fluid inlet/outlet ports 68 respectively. Step sections 70*a*, 70*b*, which are expanded toward the bore 66, are provided on side walls for forming the slit 62 (see FIG. 7).

Figure 5:
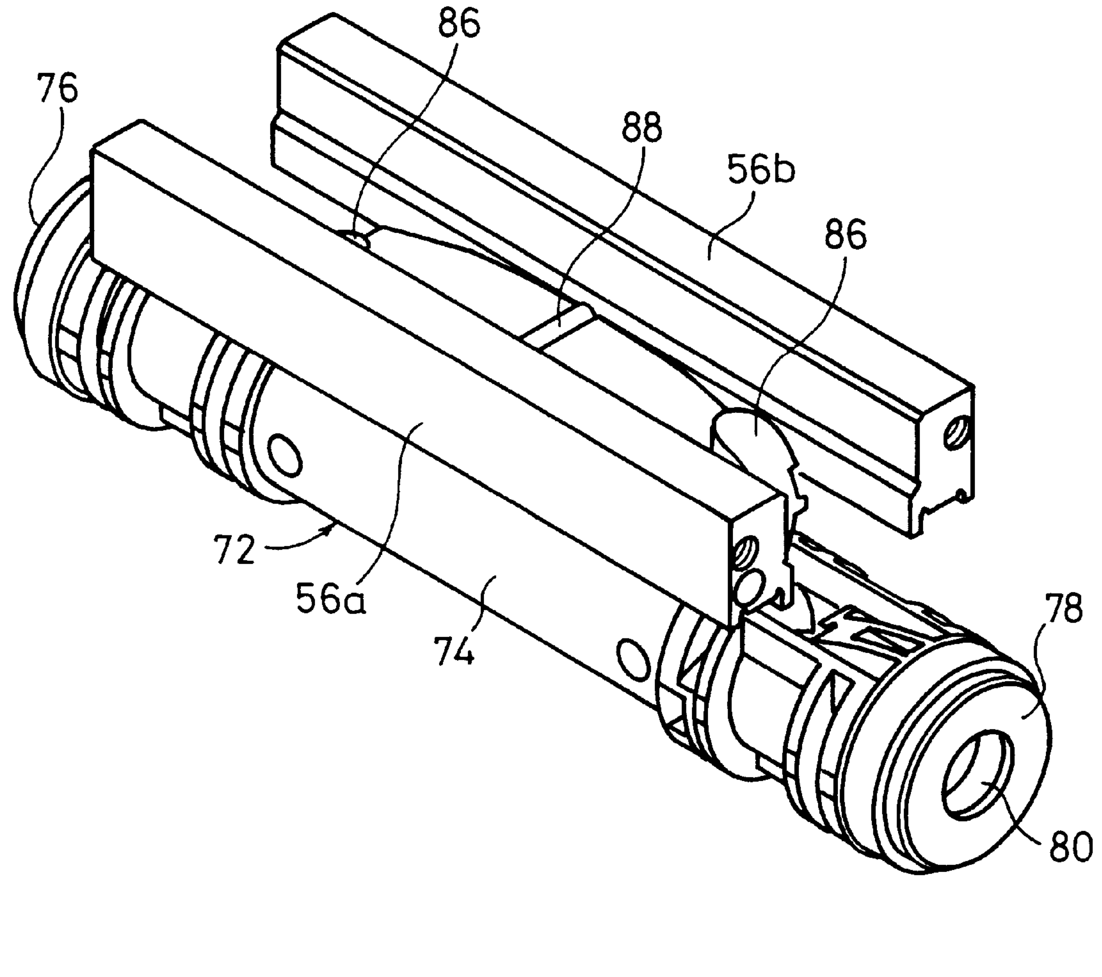
FIG. 5 shows a perspective view illustrating a piston for constructing the rodless cylinder.

FIG. 5 shows a piston 72. The piston 72 has a main piston body 74 having a substantially cylindrical configuration. A first pressure-receiving surface 76 is formed at one end of the main piston body 74 in the axial direction, and a second pressure-receiving surface 78 is formed on a side opposite thereto. A cushion seal 80 is provided at the inside thereof. A pair of belt separators 86 for separating a first seal member 82 from a second seal member 84 as described later on are arranged opposingly in the axial direction on the cylindrical main piston body 74. A parallel pin 88, which slidably contacts with the second seal member 84, is provided at a central portion between the pair of belt separators 86.

Figure 4:
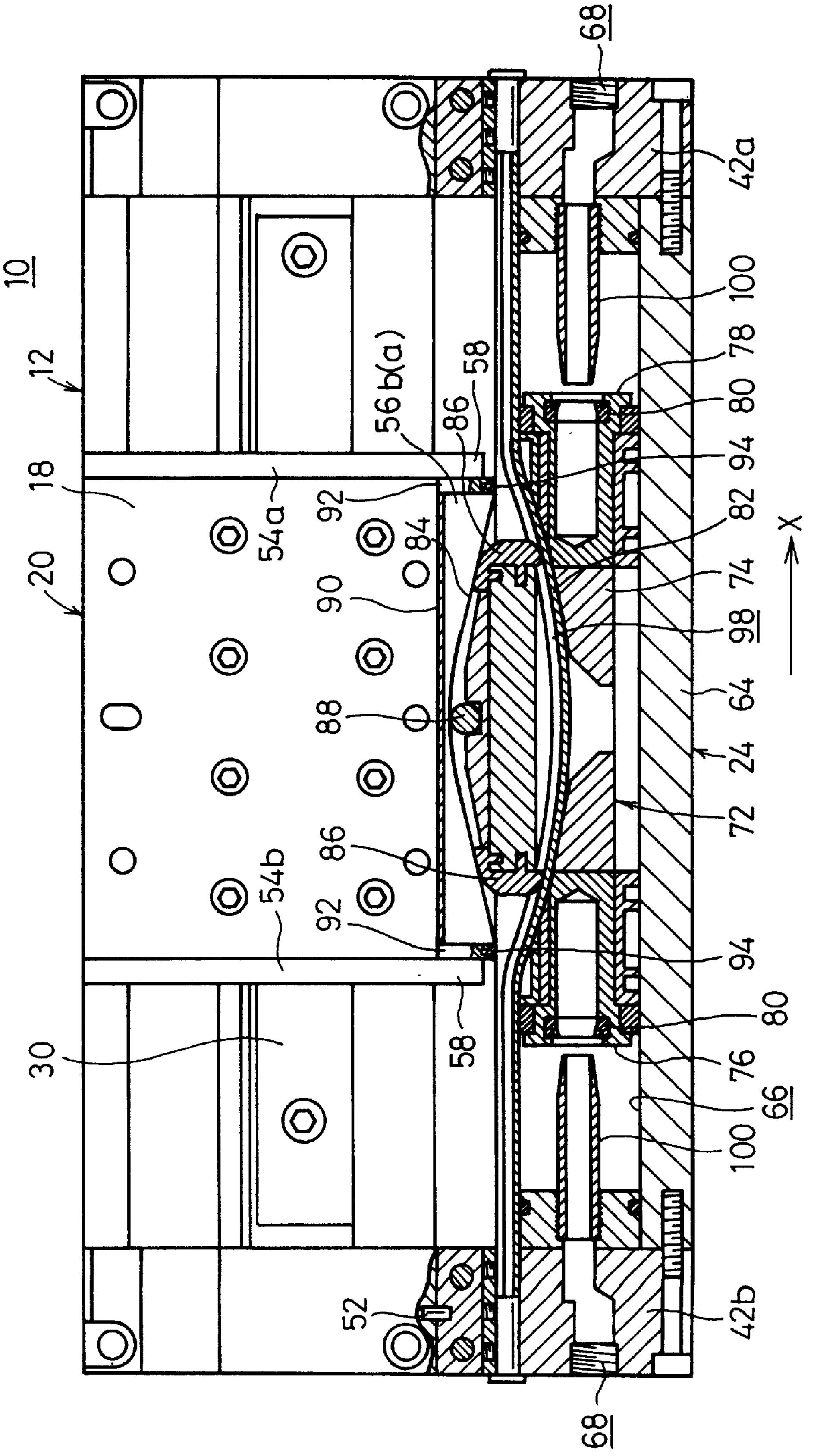
FIG. 4 shows a cross-sectional view taken along a line IV—IV shown in FIG. 1.

The main piston body 74 has the pair of piston yokes (displacement members) 56*a*, 56*b* which are formed in an integrated manner in the axial direction. The piston yokes 56*a*, 56*b* are provided so that they are engaged with the engaging sections 58 of the pair of end plates 54*a*, 54*b* of the slider 20. As shown in FIG. 4, a flat plate-shaped top cover 90 is installed to the pair of piston yokes 56*a*, 56*b*. A pair of end covers 92, which extend in a direction substantially perpendicular to the axis, are installed to both ends of the piston yokes 56*a*, 56*b* respectively. A scraper 94 is held via a groove on one narrow side surface of the end cover 92. The scraper 94 slidably contacts with the second seal member 84, and thus any dust or the like is removed.

As shown in FIG. 8, recesses, which extend in the axial direction, are formed on side surface portions in the lateral direction of the pair of piston yokes 56*a*, 56*b*. A pair of lengthy bearing members 96, which are made of a resin material and which slidably contact with the side surface of the cylinder tube 64 to support the piston 72, are installed to the recesses. The provision of the bearing members 96 makes it possible to avoid rotation of the piston 72 and avoid any contact between the piston yokes 56*a*, 56*b* and the cylinder tube 64.

In FIG. 4, reference numeral 98 indicates a passage for the first seal member 82 to enter the inside of the piston 72, and reference numeral 100 indicates cushion rings connected to the end caps 42*a*, 42*b*.

Figure 7:
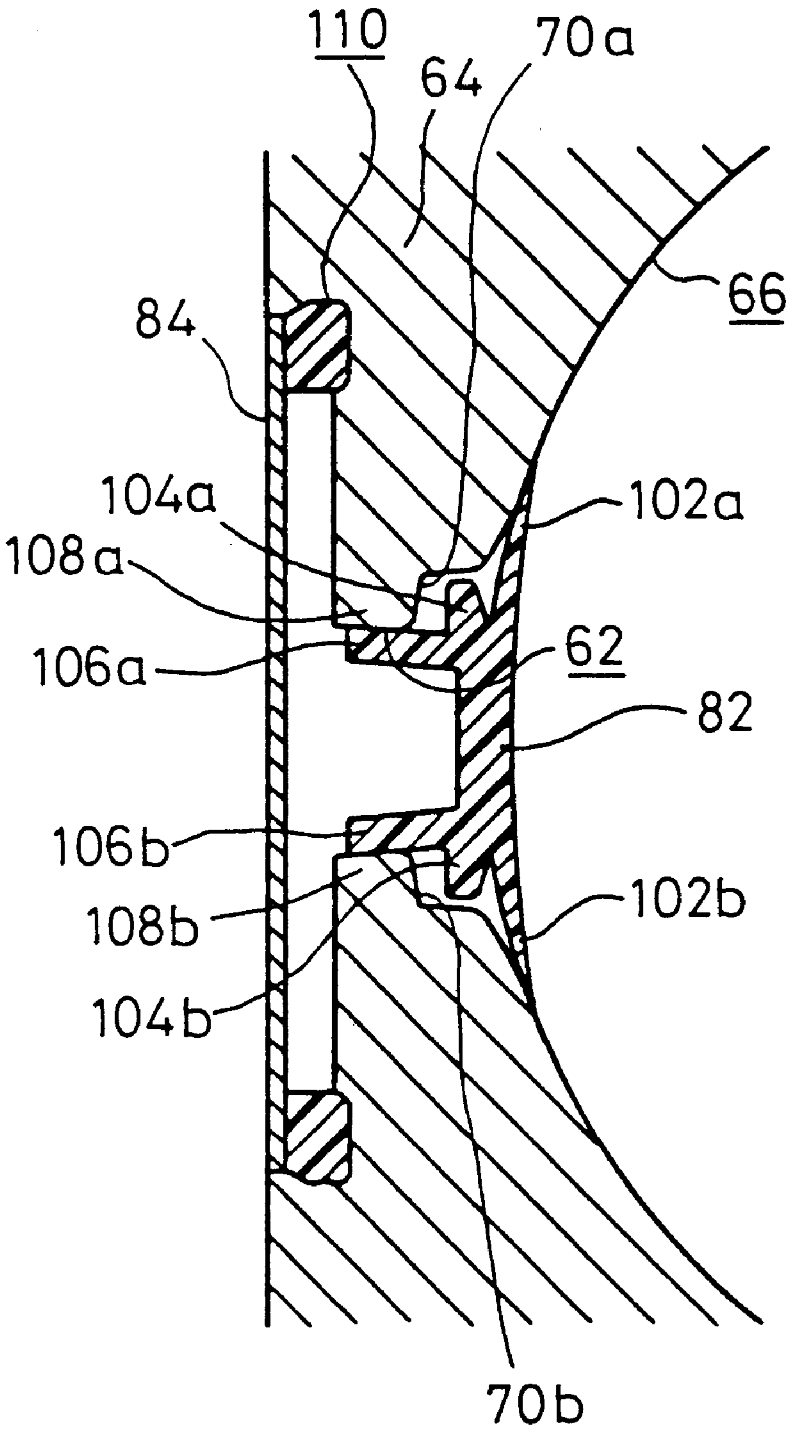
FIG. 7 shows, with partial omission, a longitudinal sectional view illustrating an engaging state of a first seal member and a slit.

FIG. 7 shows the seal member for being fitted to the step sections 70*a*, 70*b* which are formed at the slit 62 of the cylinder tube 64. The first seal member 82 has tongues 102*a*, 102*b*, and it further includes expanded sections 104*a*, 104*b* which are disposed in the lateral direction of the tongues 102*a*, 102*b*. Engaging tabs 106*a*, 106*b* extend laterally from the expanded sections 104*a*, 104*b* to make slight expansion. The expanded sections 104*a*, 104*b* are provided in order that they make engagement with the step sections 70*a*, 70*b* when the internal pressure is applied to the piston 72. The engaging tabs 106*a*, 106*b* are engaged with inner surfaces 108*a*, 108*b* for forming the slit 62. The first seal member 82 is made of a flexible synthetic resin material in an integrated manner as a whole.

On the other hand, the second seal member 84 is provided in order to close the slit 62. The second seal member 84 is engaged with a groove 110 which extends in the longitudinal direction on the side surface of the cylinder tube 64. The first seal member 82 enters the inside of the passage 98 of the piston 72, and it has both ends which are secured to the end caps 42*a*, 42*b* together with the second seal member 84.

The linear working apparatus 10 according to the embodiment of the present invention is basically constructed as described above. Next, its operation, function, and effect will be explained.

When the compressed air is introduced from the first pressure fluid inlet/outlet port 68 formed on the end cap 42, then the compressed air passes through the passage formed at the inside of the cushion ring 100, and it presses the first pressure-receiving surface 76. The piston 72 is displaced rightwardly (in the direction of the arrow X) as viewed in FIG. 4 in accordance with the pressing action of the compressed air. During this process, the piston 72 is displaced integrally with the pair of piston yokes 56*a*, 56*b*. The belt separator 86 functions to separate the first seal member 82 from the second seal member 84 when the piston yokes 56*a*, 56*b* are displaced.

When the piston yokes 56*a*, 56*b* are displaced in the longitudinal direction of the cylinder tube 64, the slider 20 is displaced integrally with the piston yokes 56*a*, 56*b* in accordance with the guiding action of the rail member 30 by the aid of the pair of end plates 54*a*, 54*b* which are substantially engaged with the piston yokes 56*a*, 56*b*.

The pin of the shock absorber 26*a* (26*b*) abuts against the abutment surface 60 formed on the end plate 54*a* (54*b*) of the slider 20 to arrive at the displacement terminal position thereby. During this process, the shock generated upon the abutment is absorbed in accordance with the buffering action of the shock absorber 26*a*, 26*b*.

On the other hand, when the compressed air is introduced into the second pressure fluid inlet/outlet port 68 formed on the end cap 42*a*, the operation is performed in a way opposite to the above.

In the embodiment of the present invention, the rodless cylinder 24 is arranged closely substantially in parallel to the axis of the rail member 30 with the rail member 30 disposed therebetween. The pair of shock absorbers 26*a*, 26*b* are arranged closely to be substantially parallel to the axis of the rail member 30 on the side opposite to the rodless cylinder 24. In other words, with reference to the rail member 30 disposed substantially centrally, the rodless cylinder 24 and the shock absorbers 26*a*, 26*b* are arranged closely to be substantially parallel to one another on the both sides thereof.

Therefore, owing to the arrangement in which the rail member 30 and the rodless cylinder 24 are arranged closely substantially in parallel to one another, and the shock absorbers 26*a*, 26*b* and the rail member 30 are arranged closely substantially in parallel to one another, it is possible to arrange, in the ideal layout, the three components of the rail member 30 which functions as the track mechanism, the rodless cylinder 24 which functions as the driving mechanism, and the shock absorbers 26*a*, 26*b* which function as the buffering mechanism. Further, it is possible to realize a compact size of the entire apparatus. As a result, the load on the rail member 30 can be reduced and mitigated by suppressing the reaction force generated, for example, when the operation of the slider 20 is started.

In the embodiment of the present invention, the rodless cylinder 24 and the base plate 12 provided with the rail member 30 and the shock absorbers 26*a*, 26*b* are provided detachably by the aid of the attachment mechanism 22. Accordingly, it is easy to exchange the driving mechanism. Further, it is possible to increase the degree of freedom of selection of the driving mechanism, and it is possible to improve the versatile property. In this arrangement, the screw member 46, which is used to connect the base plate 12 and the rodless cylinder 24, can be screwed from the upward position in the direction perpendicular to the workpiece attachment surface 18 of the slider 20. Accordingly, the apparatus is advantageous in that the attachment and the detachment can be conveniently performed with ease.

The driving force of the rodless cylinder 24 can be transmitted to the slider 20 by allowing the piston yokes 56*a*, 56*b* to make the engagement between the engaging sections 58 of the pair of end plates 54*a*, 54*b*. Therefore, the driving force can be smoothly transmitted by using the simple arrangement. In this case, a predetermined clearance (not shown) is provided between the piston yoke 56*a* (56*b*) and the engaging section 58 of the end plate 54*a* (54*b*). The floating function to permit the displacement of the piston yoke 56*a* (56*b*) is effected by the aid of the clearance.

The abutment surface 60 for making the abutment against the pin of the shock absorber 26*a* (26*b*) is simultaneously provided on the end plate 54*a* (54*b*) in addition to the engaging section 58 for making the engagement with the piston yoke 56*a* (56*b*). Accordingly, it is possible to reduce the number of parts.

The embodiment of the present invention has been explained based on the use of the rodless cylinder 24 in which the piston 72 is displaced in accordance with the action of the pressure fluid as the driving mechanism. However, there is no limitation thereto. It is a matter of course that other driving mechanisms are usable, including, for example, a magnet type rodless cylinder in which an external movable member is displaced in accordance with the action of a magnet, a linear actuator which includes a fluid pressure-operated cylinder, and an electric actuator in which an external movable member is displaced in accordance with the transmission of a rotary driving force of a rotary driving source.

What is claimed is:

1. A linear working apparatus comprising:

a base member;

a linear track mechanism secured to said base member in its axial direction;

a slider for making reciprocating movement along said track mechanism;

a driving mechanism arranged substantially in parallel to said axis of said track mechanism, for transmitting rectilinear motion to said slider; and a buffering mechanism arranged on a side opposite to said driving mechanism with said track mechanism interposed therebetween, for regulating a displacement terminal end of said slider and absorbing shock applied to said slider.

2. The linear working apparatus according to claim 1, wherein said driving mechanism is provided detachably with respect to said base member by the aid of an attachment mechanism.

3. The linear working apparatus according to claim 1, wherein said slider is provided with a pair of end plates for making engagement with displacement members of said driving mechanism for transmitting said rectilinear motion, and said end plate is formed with an abutment surface for making abutment against said buffering mechanism.

4. The linear working apparatus according to claim 2, wherein said attachment mechanism includes a screw member for connecting said base member and said driving mechanism, and said screw member is capable of being screwed in a direction substantially perpendicular to a workpiece attachment surface of said slider.

5. The linear working apparatus according to claim 2, wherein a positioning mechanism for connecting said base member and said driving mechanism in a positioned state is provided at a connecting portion between said base member and said driving mechanism.

6. The linear working apparatus according to claim 1, wherein said driving mechanism is composed any one of a fluid pressure-operated rodless cylinder in which a piston is displaced in accordance with an action of a pressure fluid, a magnet type rodless cylinder in which an external movable member is displaced in accordance with an action of a magnet, a linear actuator, and an electric actuator.

7. The linear working apparatus according to claim 1, wherein said track mechanism is composed of a linear guide mechanism, and said linear guide mechanism includes a lengthy rail member and a rolling member or a sliding member for making displacement along said rail member.

8. The linear working apparatus according to claim 1, wherein said buffering mechanism is composed of a plurality of shock absorbers, and said shock absorbers are arranged substantially in parallel to said axis of said track mechanism at ends of said base member.

9. The linear working apparatus according to claim 3, wherein a predetermined clearance is provided between said end plate and said displacement member, and a floating function to permit displacement of said displacement member is effected by the aid of said clearance.

10. The linear working apparatus according to claim 5, wherein said positioning mechanism includes a small hole formed on one side surface of an end block connected to an end of said base member, and a projection protruding from an end cap of said driving mechanism, for being inserted into said small hole.

* * * * *